United States Patent [19]
Ehrlich

[11] Patent Number: 5,337,315
[45] Date of Patent: Aug. 9, 1994

[54] STUFFING PROCESS FOR REDUCING WAITING TIME JITTER AND DEVICE FOR EXECUTING THE PROCESS

[75] Inventor: Wolfgang Ehrlich, Allmersbach im Tal, Fed. Rep. of Germany

[73] Assignee: Ant Nachrichtentechnik GmbH, Backnang, Fed. Rep. of Germany

[21] Appl. No.: 940,886
[22] PCT Filed: Mar. 9, 1991
[86] PCT No.: PCT/DE91/00205
 § 371 Date: Oct. 23, 1992
 § 102(e) Date: Oct. 23, 1992
[87] PCT Pub. No.: WO91/16774
 PCT Pub. Date: Oct. 31, 1991

[30] Foreign Application Priority Data
Apr. 26, 1990 [DE] Fed. Rep. of Germany ....... 4013317

[51] Int. Cl.$^5$ .................................................. H04J 3/06
[52] U.S. Cl. ...................................... 370/102; 375/118
[58] Field of Search ................. 370/102, 103, 100.1, 370/105, 105.1, 105.3, 108; 375/76, 106, 113, 116, 117, 118, 112, 107

[56] References Cited
U.S. PATENT DOCUMENTS

| | | | |
|---|---|---|---|
| 4,811,340 | 3/1989 | McEachern et al. | 370/102 |
| 5,067,126 | 11/1991 | Moore | 370/102 |
| 5,146,477 | 9/1992 | Cantoni et al. | 370/102 |
| 5,172,376 | 12/1992 | Chopping et al. | 370/102 |

OTHER PUBLICATIONS

"Waiting Time Jitter Reduction by Synchronizer Stuff Threshold Modulation"; Grover et al; IEEE Proceedings Global Telecommunication Conference; Tokyo Nov. 15-18, 1987, Band 1, IEEE.
"Messung der Langzeit–Phasenschwankungen in Stuffing–Multiplexsystemen fur PCM– Und Datensignale"; Muller, Nachrichtentechnische Zeitschrift, Band 29, Nr. 4, Apr. 1976 (Berlin, DE).
"Positiv–Null–Negativ–Stopftechnik fur Die Multiplexubertragung Plesiochroner Datensignale"; Kuhne et al; Frequenz, 32 10, Seiten 281 bis 287.
"Waiting Time Jitter"; Duttweiler; The Bell System Technical Journal; vol. 51, No. 1, Jan., 1972.
"Waiting Time Jitter Reduction"; Choi; IEEE Transactions on Communications; vol. 37, No. 11, Nov., 1989.

*Primary Examiner*—Benedict V. Safourek
*Assistant Examiner*—Dang Ton
*Attorney, Agent, or Firm*—Spensley Horn Jubas & Lubitz

[57] ABSTRACT

A stuffing process and device for reducing waiting time jitter by: determining the mean loading of an elastic memory as precisely as possible; determining a loading error constituted by a difference between an actual value and a set value of the mean loading; producing a sum of successive loading errors; and determining the manner in which stuffing is to take place in order to keep the error sum as constant as possible.

5 Claims, 2 Drawing Sheets

STUFFING PROCESS FOR REDUCING WAITING TIME JITTER AND DEVICE FOR EXECUTING THE PROCESS

BACKGROUND OF THE INVENTION

The present invention relates to a stuffing process and apparatus for reducing waiting time jitter, of the type in which:

a. a first digital signal (A) with a first bit rate is supplied to a synchronizer and the first digital signal is written into an elastic memory (ES) in the synchronizer with a first clock pulse ($t_A$) having a pulse rate which corresponds to the first bit rate of the first digital signal (A);

b. a second digital signal (B) is read out of the elastic memory (ES) at a second bit rate with a second clock pulse ($t_B$) having a pulse rate which corresponds to the second bit rate of the second digital signal (B), whereby the elastic memory (ES) will have a mean loading; and c. in a frame counter (RZ), stuffing frames of the second digital signal (B) are generated, reading out of the elastic memory is controlled, and stuffing is performed as a function of a control parameter supplied to the frame counter.

If a first asynchronous digital signal is intended to be inserted into a second digital signal, the basic problem of frequency adaption arises. This problem is solved by stuffing. A problem of the conventional stuffing process lies in that the first digital signal recovered by destuffing may contain a low-frequency jitter, waiting time jitter, which can no longer be removed. The size of this jitter is the result of the stuffing process employed.

The conventional process for positive stuffing and the size of waiting time jitter caused by this is known from D. L. Duttweiler, in "Waiting Time Jitter", The BELL system Technical Journal, Vol. 51, No. 1, 1972, pages 165 to 207. Waiting time jitter in the course of positive-null-negative-null stuffing is treated in an article by F. Kühne, K. Lang, in "Positiv-Null-Negativ-Stopftechnik für Multiplexübertragung plesiochroner Datensignale" [Positive-Null-Negative Stuffing Technology for Multiplex Transmission of Plesiochronous Data Signals], Frequenz [Frequency], Vol. 32, No. 10, 1978, pages 281 to 287.

It is known from this reference to supply a first digital signal with a first bit rate to a synchronizer and to write it there with a first pulse corresponding to the bit rate of the first digital signal into an elastic memory. A second digital signal is read out of the memory with a second pulse, the second clock rate corresponding to the bit rate of the second digital signal. The frame of the second digital signal is generated and the read activation of the elastic memory is controlled in counters. The mean loading of the elastic memory is determined once per frame of the second digital signal. A difference between the mean loading and the set value for the mean loading is formed for each stuffing frame of the second digital signal. It is known to compare the difference with a maximum deviation. If the difference is greater than the maximum deviation, stuffing is performed.

A process for reducing waiting time jitter in the course of positive-null-negative stuffing was described by D. CHOI in "Waiting Time Jitter Reduction", IEEE Transactions on Communications, Vol. 37, No. 11, 1989, pages 1231 to 1236. The author assumes that a nominal stuffing process from null, such as is the case in the positive-negative stuffing process, results in large waiting time jitter. Therefore, the proposed process initiates a stuffing ratio not equal to null and in this way achieves a reduction of waiting time jitter.

In the publication by W. D. Grover, T. E. Moore, J. A. McEachern in "Waiting Time Jitter Reduction by Synchronizer Stuff Threshold Modulation", GLOBECOM '87, pages 514 to 518, additional stuffing operations are provided for reducing waiting time jitter, which additional stuffing operations take place in such sequence that the effect is a frequency displacement of the jitter. It is only required for executing this process to provide a new control in the synchronizer for the time when stuffing is intended. While up to now stuffing was always performed when constant thresholds were exceeded in either direction, the thresholds are modulated in the present case.

This species-defining reference therefore proceeds from a method corresponding to that in the article by Kühne and Lang. However, the method does not operate with fixed thresholds, instead, the thresholds are modulated.

The processes for reducing waiting time jitters described in these articles each have a free parameter, by means of which waiting time jitter is defined (for example the length of the periods in the case of threshold modulation). However, it is not permissible to choose this parameter in such a way that the smallest possible waiting time jitter results. Instead, the critical frequency of the PLL circuit of the desynchronizer must be taken into consideration. The larger this critical frequency, the more waiting time jitter must be allowed by means of the choice of the free parameter. If this is not taken into account, an additional jitter component is superimposed on the pulse generated by the desynchronizer, which is greater than the waiting time jitter.

There is a necessity of adapting the synchronizer and the desynchronizer structurally to each other on account of the free parameter. If the critical frequency of the PLL circuit is greater than expected, there will be increased jitter of the recovered pulse. But if in contrast to this the critical frequency of the PLL circuit is smaller than expected, this jitter is only negligibly reduced, because in this case waiting time jitter is dominant.

SUMMARY OF THE INVENTION

It is the object of the invention to recite a process by means of which waiting time jitter can be reduced with the use of arbitrary customary desynchronizers, and to recite a device by means of which this process calm be executed.

The objects according to the invention are achieved by an improvement in the method described at the beginning of this specification, which improvement includes the steps of:

determining the mean loading of the elastic memory (ES) at a rate of once per stuffing frame of the second digital signal (B);

producing an indication of a difference between the mean loading and a selected loading value for each stuffing frame of the second digital signal (B);

deriving a sum of the difference indicated during an existing stuffing frame and all previous stuffing frames for which the steps of determining and producing were performed;

deriving, from the difference indicated during an existing stuffing frame and the current sum, an estimated sum value for the next occurring stuffing frame on the assumption that stuffing will not be performed during the next occurring stuffing frame;

comparing the estimated sum value with at least one threshold value and determining, as a function of this comparison, a control parameter value which can control stuffing in a manner such that the sum derived in the first-recited deriving step remains at least approximately constant; and supplying the value determined in the comparing step as the control value, to the frame counter (RZ).

The objects according to the invention are further achieved, in a device of the type described earlier herein by the improvement wherein such device further includes:

means for determining the mean loading of the elastic memory (ES) at a rate of once per stuffing frame of the second digital signal (B);

means for producing an indication of a difference between the mean loading and a selected loading value for each stuffing frame of the second digital signal (B);

means for deriving a sum of the difference indicated during an existing stuffing frame and all previous stuffing frames for which a mean loading was previously determined and an indication of a difference was previously produced;

means for deriving, from the difference indicated during an existing stuffing frame and the current sum, an estimated sum value for the next occurring stuffing frame on the assumption that stuffing will not be performed during the next occurring stuffing frame;

means for comparing a currently derived estimated sum value with at least one threshold value and for determining, as a function of this comparison, a control parameter value which can control stuffing in a manner such that the sum derived by the means for deriving remains at least approximately constant; and means for supplying the value determined by the means for comparing, as the control value, to the frame counter (RZ).

By means of the stuffing process in accordance with the invention, a first digital system is inserted into a second digital signal in such a way, that the first digital signal can be recovered arbitrarily free of jitter. A further advantage is that standardized frames can be employed for the second digital signal. In accordance with the invention, a customary process and thus a customary desynchronizer can be used for destuffing. The properties of the stuffing process mentioned are attained by deformation of the spectrum of the stuffing jitter. In this case the proportion of time low frequencies of the stuffing jitter should be small, because these components cannot be filtered out by the PLL arrangements contained in the desynchronizers.

To achieve by means of the stuffing process in accordance with the invention that the first digital signal can be recovered arbitrarily free of jitter, it is necessary to be able to determine loading of the elastic memory as accurately as possible during stuffing.

A possibility of determining loading as exactly as possible is recited in one of the exemplary embodiments.

The stuffing process in accordance with the invention is characterized by the following features: the following process steps are performed in each stuffing frame of the second digital signal:

The mean loading of the elastic memory is determined as exactly as possible. A difference between the ACTUAL value and the SET value of the mean loading of the elastic memory is determined. This difference represents the loading error. The loading error is added up, i.e. an error sum is formed. The decision as to how or whether stuffing takes place is made in view of the attempt to keep the error sum as constant as possible.

Reasons will be given below why it is important to keep the error sum as constant as possible. In the recovery of the original digital signal, the associated pulse is present in a strongly jittered form. It is customary to filter out the high-frequency portions of this jitter in the desynchronizer, for example with a PLL circuit, for the stuffing frames of the second digital signal B. The transmission function of the filter can be compared approximately with that of an integrator, where the integrator forms the integral of the loading error. Because the error sum is also to be considered an approximation for the integral of the loading error, there is an approximate proportional connection between the time characteristic of the error sum and the time characteristic of the jitter of the filtered pulse of the recovered original digital signal.

The critical frequency of the filter and the reciprocal stuffing frame frequency of the second digital signal B enter into the proportionality constant. Thus, as constant as possible an error sum determines a phase unchanged in time, a reduction of the critical frequency of the filters results in a reduction of jitter.

BRIEF DESCRIPTION OF THE DRAWING

Exemplary embodiments of the invention will be described by means of the drawings. Shown are in.

DESCRIPTION OF THE PREFERRED EMBODIMENTS

Figure 1:
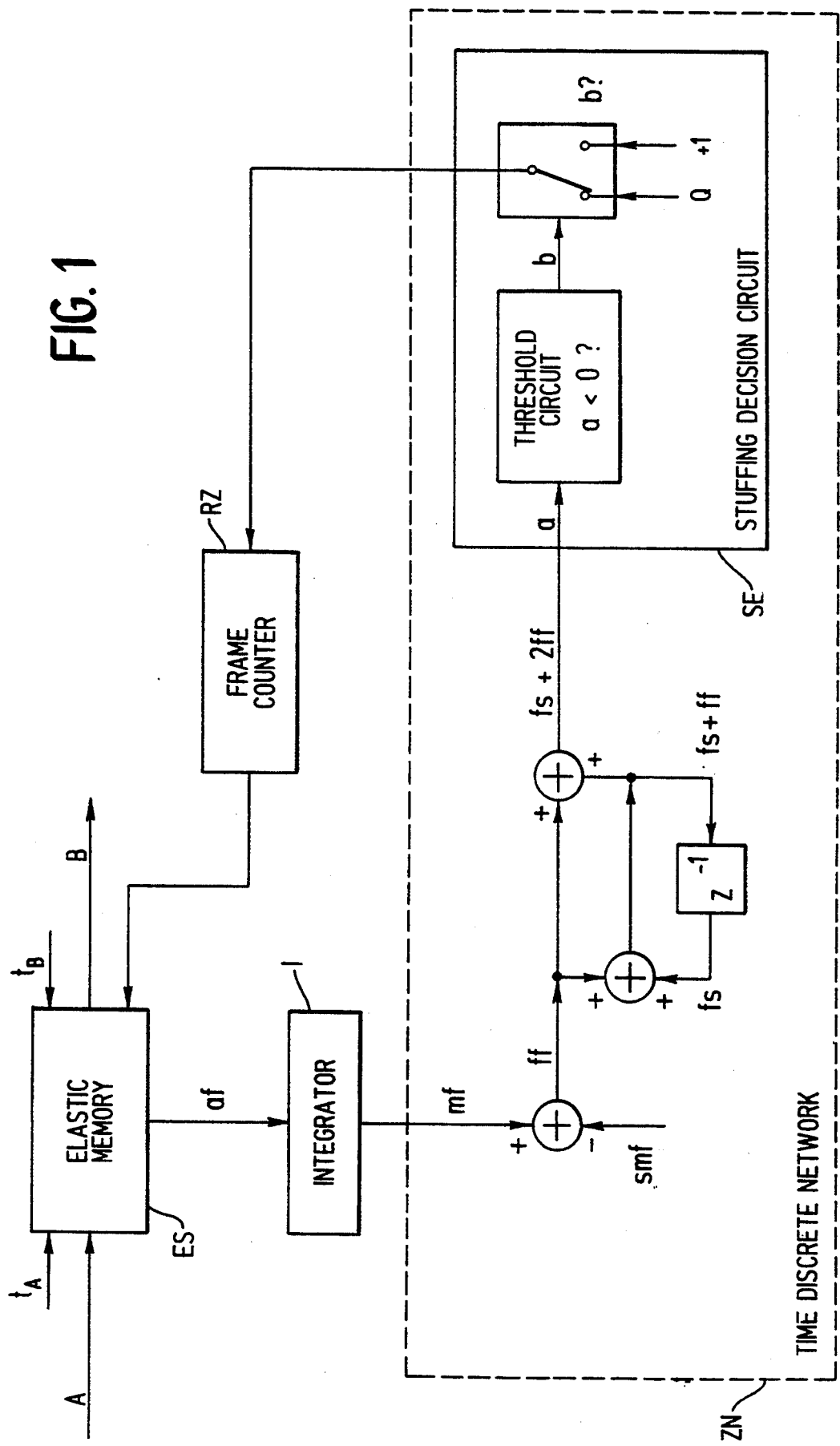
FIG. 1a synchronizer for positive stuffing.

FIG. 1 shows a circuit which makes stuffing decisions during positive stuffing in such a way that the error sum remains as constant as possible. A first digital signal A with a first bit rate corresponding to a first pulse $t_A$ is supplied to the synchronizer. The output signal of the synchronizer is a second digital signal B with a second bit rate corresponding to a second pulse $t_B$. This second digital signal B is transmitted to a desynchronizer (not shown in the drawing figure), in which the first digital signal A with the first bit rate is regenerated. The bit rates of the data signals A and B have been selected to be such, that a transmission of the first digital signal A in the second digital signal B is possible by means of pulse stuffing techniques. The synchronizer has an elastic memory ES, to which the first digital signal A is supplied. It is written in with the pulse $t_A$. The second digital signal B is read out of the elastic memory ES with the pulse $t_B$. A frame counter RZ is provided for generating the frame of the second digital signal and controls the read activation of the elastic memory ES. The elastic memory ES signals by means of the actual loading af how many bits are in the memory at the time. The actual loading af is increased by one bit when a bit is written into the elastic memory, when reading out a bit the actual loading af is decreased by one bit. The integrator I forms the mean loading mf from the actual loading af. The mean loading mf is the integral of the actual loading af over a given window of time. The integrator I provides a new value for the mean loading mf for each frame of the digital signal B. The mean loading of the elastic memory ES is supplied to a time-discrete network ZN, which is clocked with the stuffing frame frequency of the second digital signal B. First, the mean loading mf is compared with the SET value of the mean loading mf in this time-discrete network ZN. The loading error ff is determined in this way. The sum of the loading errors ff of all previous stuffing frames, the previous error sum fs, is available. The error sum of the instantaneous stuffing frame of the digital signal B is formed from the loading error ff and the previous error sum fs, ff+fs, in the time-discrete network ZN. An estimated value for the error sum in the next stuffing frame of the digital signal B, fs+2ff, is formed from this error sum of the instantaneous stuffing frame of the digital signal B and the loading error of the instantaneous digital signal B. The estimated value for the next error sum fs+2ff is supplied to a circuit SE for making the stuffing decision. It is decided in this circuit SE whether stuffing should take place. If the estimated value of the error sum in the next frame lies above a threshold, stuffing will not be performed. However, if its lies below this threshold, positive stuffing takes place. The information as to whether stuffing is performed is passed on by the circuit SE for making the stuffing decision to the frame counter RE.

Figure 2:
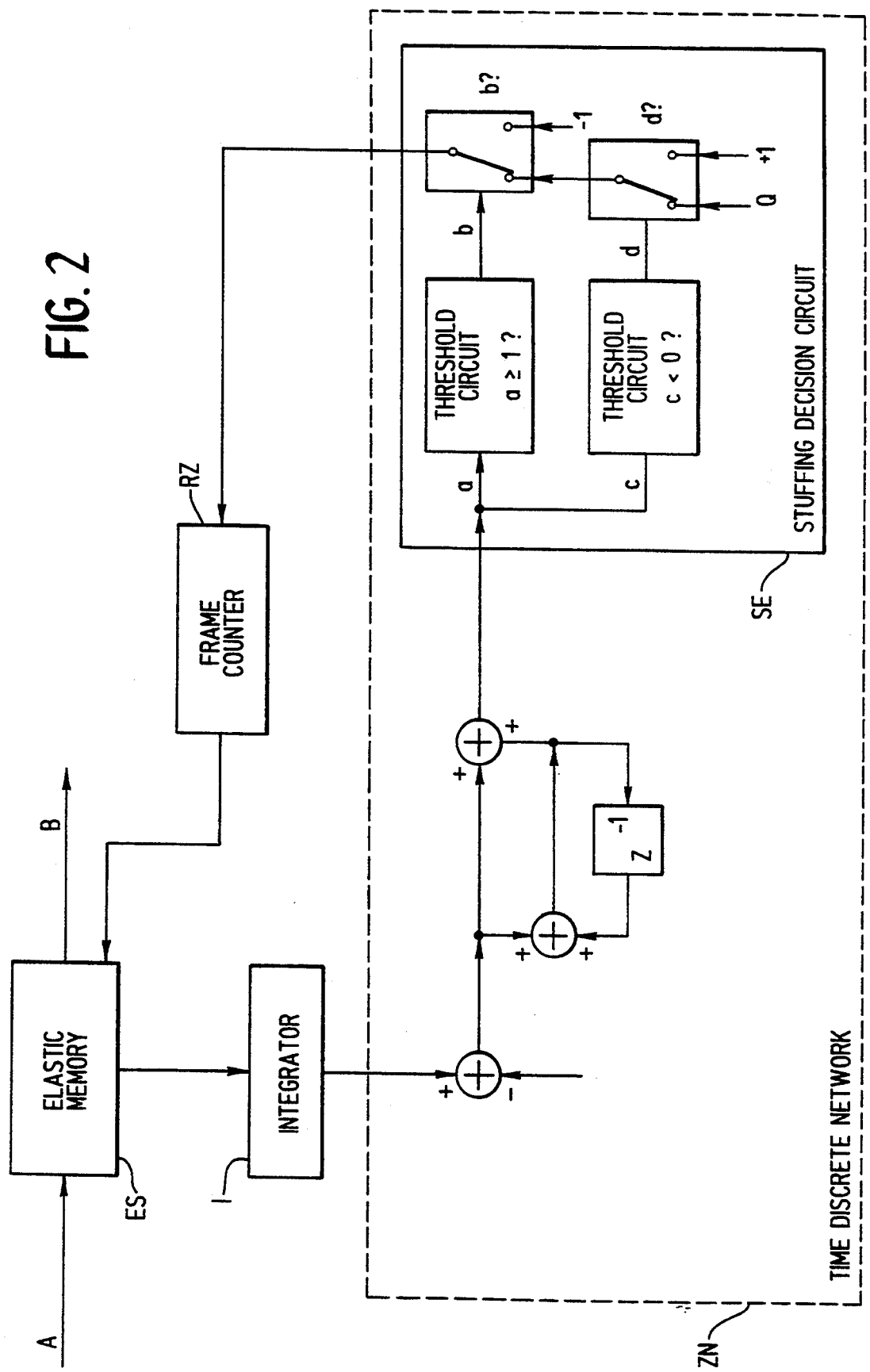
FIG. 2 a synchronizer for positive-null-negative stuffing.

A synchronizer for positive-null-negative stuffing is illustrated in FIG. 2. It differs from the synchronizer for positive stuffing by the design of the circuit SE for making the stuffing decision. During positive-null-negative stuffing, the stuffing decision is also made in this circuit in such a way, that the error sum remains as constant as possible. The decision is made with the aid of a pair of thresholds, the thresholds of which are at distance of one bit. If the estimated value of the error sum in the next stuffing frame of the digital signal B lies within a pair of thresholds, stuffing is not performed. However, if the value lies outside of the pair of thresholds, either positive or negative stuffing is performed, depending on the deviation of the estimated value from the pair of thresholds.

In each case a stuffing ratio of zero is made the basis for forming the estimated value of the error sum of the next stuffing frame of the digital signal B.

I claim:

1. In a stuffing process for reducing waiting time jitter, which process includes the steps of:
    a. supplying a first digital signal (A) with a first bit rate to a synchronizer and writing the first digital signal into an elastic memory (ES) in the synchronizer with a first clock pulse ($t_A$) having a pulse rate which corresponds to the first bit rate of the first digital signal (A);
    b. reading a second digital signal (B) at a second bit rate out of the elastic memory (ES) with a second clock pulse ($t_B$) having a pulse rate which corresponds to the second bit rate of the second digital signal (B), whereby the elastic memory (ES) will have a mean loading; and
    c. in a frame counter (RZ), generating stuffing frames of the second digital signal (B), controlling reading out of the elastic memory, and performing stuffing as a function of a control parameter supplied to the frame counter, the improvement wherein said process further comprises:
    d. determining the mean loading of the elastic memory (ES) at a rate of once per stuffing frame of the second digital signal (B);
    e. producing an indication of a difference between the mean loading and a selected loading value for each stuffing frame of the second digital signal (B);
    f. deriving a sum of the difference indicated during an existing stuffing frame and all previous stuffing frames for which said steps of determining and producing were performed;
    g. deriving, from the difference indicated during an existing stuffing frame and the sum derived in step f, an estimated sum value for the next occurring stuffing frame on the assumption that stuffing will not be performed during the next occurring stuffing frame;
    h. comparing the estimated sum value with at least one threshold value and determining, as a function of this comparison, a control parameter value which can control stuffing in a manner such that the sum derived in step f remains at least approximately constant; and
    i. supplying the value determined in step h, as the control value, to the frame counter (RZ).

2. A stuffing process in accordance with claim 1, wherein the process includes positive stuffing, and during positive stuffing the estimated sum value is compared with a threshold and stuffing is always performed if the estimated value lies below the threshold and is not performed if the estimated value lies above the threshold.

3. A stuffing process in accordance with claim 1, wherein the process includes positive-null-negative stuffing, and during positive-null-negative stuffing, the estimated sum value in the next stuffing frame of the second digital signal (B) is compared with a pair of threshold values, and stuffing is performed if the estimated sum value lies outside of the range of values between the pair of threshold values and is not performed if the estimated value lies within the range of values between the pair of threshold values.

4. A device for carrying out the process in accordance with claim 1, comprising:
    a. an elastic memory (ES) having a write input connected for writing in of the first digital signal (A) under control of the first clock pulse ($t_A$) having a pulse rate which corresponds to the first bit rate of the first digital signal (A) and a read output connected for reading out the second digital signal (B) under control of the second clock pulse ($t_B$) having a pulse rate which corresponds to the second bit rate of the second digital signal (B), whereby the elastic memory (ES) will have a mean loading; and
    b. a frame counter (RZ) for generating stuffing frames of the second digital signal (B) at a stuffing frame frequency, controlling reading out of the elastic memory (ES) and performing stuffing as a function of a control parameter supplied to said frame counter, wherein said device further comprises:
    c. a circuit for determining the mean loading (I) of said elastic memory (ES) at least once per stuffing frame of the second digital signal (B);
    d. a time-discrete network (ZN) which is clocked at the stuffing frame frequency of the second digital signal (B) and to which the mean loading is supplied, said time-discrete network (ZN) being operative to determine a control parameter value which controls stuffing in such a way that the sum of the differences between the mean loading and a set value for the mean loading, a respective one of which differences is formed for each stuffing frame of the second digital signal, remains at least approximately constant for all stuffing frames of the second digital signal (B), and said time-discrete network (ZN) further being operative to determine, from the difference indicated during an existing stuffing frame and the current sum, an estimated sum value for the next occurring stuffing frame on the assumption that stuffing will not be performed during the next occurring stuffing frame;

e. a circuit (SE) connected to receive the estimated sum value and for performing the comparing step, said circuit (SE) being operative for comparing the estimated value with at least one threshold and for determining, as a function of this comparison, the control parameter value which can control stuffing so that the sum of the differences remains at least approximately constant; and f. means connected for supplying the determined control parameter value to said frame counter (RZ).

5. In a stuffing device for reducing waiting time jitter, which device includes:

a. means for supplying a first digital signal (A) with a first bit rate to a synchronizer and for writing the first digital signal into an elastic memory (ES) in the synchronizer with a first clock pulse ($t_A$) having a pulse rate which corresponds to the first bit rate of the first digital signal (A);

b. means for reading a second digital signal (B) at a second bit rate out of the elastic memory (ES) with a second clock pulse ($t_B$) having a pulse rate which corresponds to the second bit rate of the second digital signal (B), whereby the elastic memory (ES) will have a mean loading; and c. a frame counter (RZ) containing means for generating stuffing frames of the second digital signal (B), for controlling reading out of the elastic memory, and for performing stuffing as a function of a control parameter supplied to the frame counter, the improvement wherein said device further comprises:

d. means for determining the mean loading of the elastic memory (ES) at a rate of once per stuffing frame of the second digital signal (B);

e. means for producing an indication of a difference between the mean loading and a selected loading value for each stuffing frame of the second digital signal (B);

f. means for deriving a sum of the difference indicated during an existing stuffing frame and all previous stuffing frames for which a mean loading was previously determined and an indication of a difference was previously produced;

g. means for deriving, from the difference indicated during an existing stuffing frame and the sum derived by said means for deriving a sum of the difference, an estimated sum value for the next occurring stuffing frame on the assumption that stuffing will not be performed during the next occurring stuffing frame;

h. means for comparing a currently derived estimated sum value with at least one threshold value and for determining, as a function of this comparison, a control parameter value which can control stuffing in a manner such that the sum derived by said means for deriving remains at least approximately constant; and i. means for supplying the value determined by said means for comparing, as the control value, to said frame counter (RZ).

* * * * *